Aug. 31, 1965 C. KARPIEJ Re. 25,848
FUEL CONTROL FOR SPARK IGNITION INTERNAL COMBUSTION ENGINES
Original Filed Dec. 5, 1955
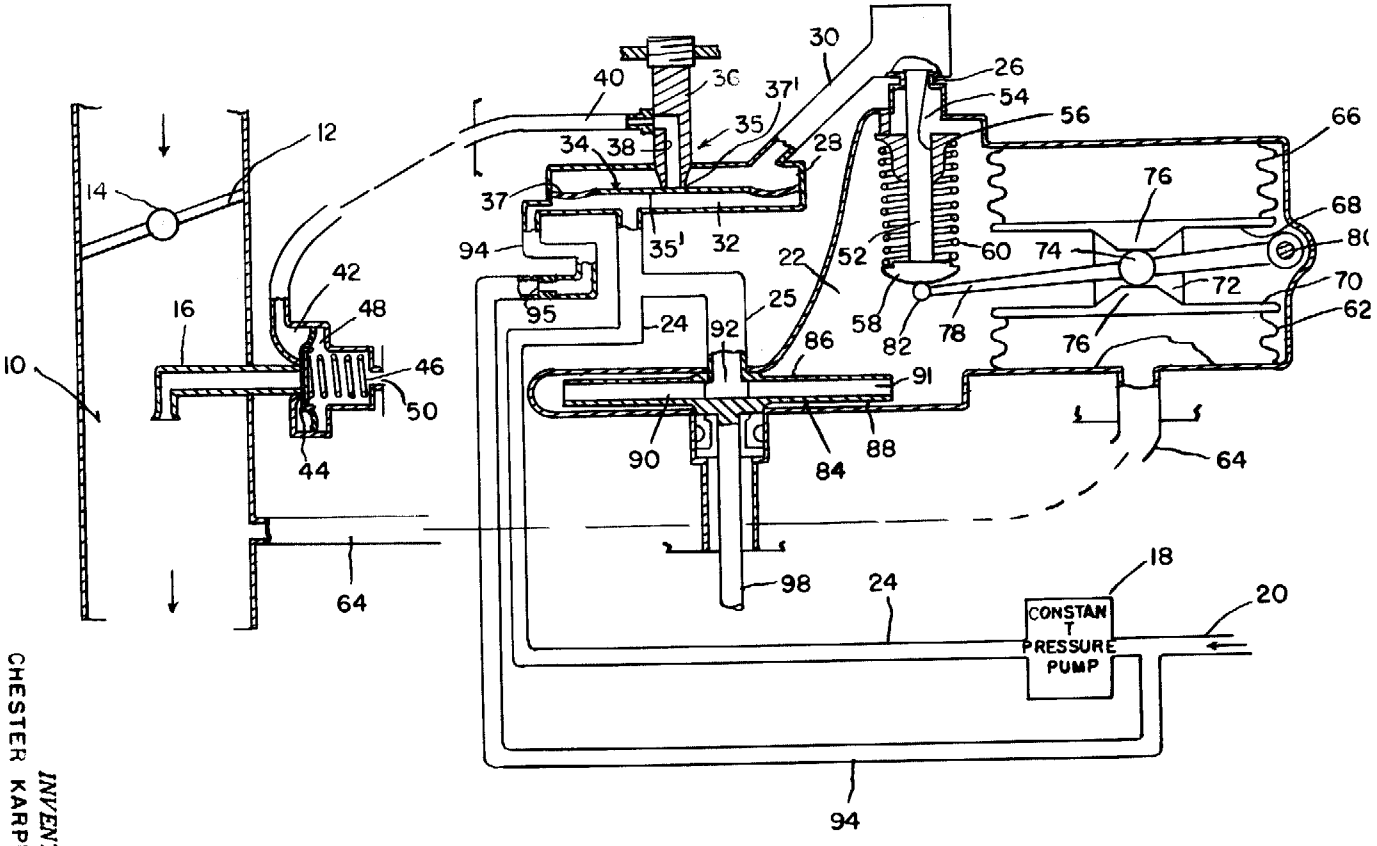
INVENTOR
CHESTER KARPIEJ
BY
Whittemore, Hulbert & Belknap
ATTORNEYS United States Patent Office Re. 25,848
Reissued Aug. 31, 1965

25,848

FUEL CONTROL FOR SPARK IGNITION INTERNAL COMBUSTION ENGINES

Chester Karpiej, Detroit, Mich., by Holley Carburetor Company, Van Dyke, Mich., a corporation of Michigan, assignee Original No. 2,898,899, dated Aug. 11, 1959, Ser. No. 551,064, Dec. 5, 1955. Application for reissue Oct. 17, 1963, Ser. No. 326,312
9 Claims. (Cl. 123—139)

Matter enclosed in heavy brackets [ ] appears in the original patent but forms no part of this reissue specification; matter printed in italics indicates the additions made by reissue.

This invention relates to fuel control for spark ignition internal combustion engines.

One object of this invention is to provide a fuel control which utilizes engine speed and manifold pressure as signals to meter fuel, eliminating the need for a venturi which is a restriction to air flow normally found in conventional carburetors.

Another object of the invention is to provide a fuel control which eliminates the need for a float bowl found in conventional carburetors, thus providing for improved operation in any position.

A further object of the invention is to provide a fuel control which is so designed that it may be installed at any point on the engine, its location not being restricted to any one location.

Still another object of the invention is to provide a fuel control which requires few rubbing surfaces, eliminating difficulties due to friction losses at points where low pressure differences occur.

Other objects of the invention will become apparent as the following description proceeds, especially when taken in conjunction with the accompanying drawing, wherein:

The single figure is a diagrammatical view of a fuel control constructed in accordance with the present invention.

Referring now more particularly to the drawing, the numeral 10 designates a manifold intake passage through which air is drawn into the engine manifold in the direction of the arrows. A throttle plate 12 is provided in the intake passage 10 and is mounted therein for pivotal movement about the pivot axis 14. Fuel is admitted to the intake passage 10 by a nozzle 16 opening into the passage downstream from the throttle plate.

A constant pressure fuel pump 18 is provided for delivering fuel to the nozzle 16. The pump 18 draws fuel from the customary fuel tank (not shown) through passage 20 and delivers it under pressure to chamber 22 through passages 24 and 25 and the centrifugal pump 84 described more fully hereinafter. The fuel in chamber 22 passes through metering valve or orifice 26 and passage 30 into chamber 28. The chamber 28 is separated from the chamber 32 by a flexible diaphragm or valve element 34 which forms a surface of both these chambers. The valve element 34 controls and is a part of the flow control outlet valve 35. This valve element or diaphragm consists of a central disc 35' and an annular flexible web 37 connecting the disc to the annular wall of the chambers. The position of the valve element or diaphragm relative to the seat 37' at the lower end of the body member 36 of the outlet valve 35 determines the restriction to flow from chamber 28 through the open ended passage 38 in the body member. The diaphragm 34 assumes a position such that the pressure in the chamber 28 equals that in the chamber 32. Since the pressure in chamber 32 is always constant, being supplied by the constant pressure pump 18 through passage 24, the pressure in chamber 28 and hence that at the discharge side of the metering valve 26 will remain constant. In the event of a slight increase or decrease in pressure in chamber 28, the diaphragm will move either toward or away from the seat 37' to vary the reserticiton to flow through the outlet valve and thus arrive at a new position wherein the pressure in chamber 28 will remain the same as the pressure in chamber 32.

Passage 40 leads to a chamber 42, a surface of which is defined by the valve element or flexible diaphragm 44 likewise formed of a central disc and an annular web. The diaphragm 44 is normally urged to the left as viewed in the drawing by a coil spring 46 to cover and seal the inner end of the passage in nozzle 16 to prevent fuel from flowing through chamber 42 into the nozzle. The side of the diaphragm opposite chamber 42 forms a surface of the chamber 48 which is vented to the atmosphere through opening 50.

The metering orifice 26 is controlled by a vertically disposed contoured needle valve 52. One side of the needle valve 52 is cut-away as indicated at 54 in a manner such that the effective opening of the metering orifice 26 increases as the needle valve moves upwardly and decreases as it moves downwardly. The needle valve 52 is vertically slidable in a tubular bushing 56 secured within chamber 22. An abutment member or flange 58 is secured to the lower end of the needle valve 52 and a coil spring 60 encircles the needle valve and is compressed between flange 58 and the bushing to urge the needle valve downwardly.

A bellows 62 is connected to the manifold intake passage 10 through a passage 64 so that the interior of the bellows is subjected to engine manifold pressure. An evacuated bellows 66 is located above the bellows 62. The adjacent ends of the bellows have rigid end plates 68 and 70 secured thereto which are rigidly inter-connected by a coupling 72. A ball-shaped member 74 separates the bosses 76 on the end plates which project toward one another, the ball 74 being carried by a lever 78 supported in the chamber 22 for rotation about the axis of pivot pin 80. The free end 82 of lever 78 supports the flange 58 secured to the needle valve and it will be apparent that changes in engine manifold pressure will correspondingly change the pressure within bellows 62 and thus vary the vertical position of the needle valve to vary the effective opening of orifice 26.

A vane-type centrifugal pump 84 is located in chamber 22. The pump 84 is in the form of a rotary impeller comprising the vertically spaced plates 86 and 88 having a plurality of circumferentially spaced radially outwardly extending vanes 90 extending between and secured to the plates for rotation as a unit therewith. The vanes 90 define spaces 91 therebetween which extend from the outer periphery of the impeller to the eye 92 thereof which constitutes a central hole in the upper plate 86. In operation, the pump will draw in fuel through passage 25 into the eye 92 and will discharge the fuel radially outwardly into the chamber 22 about the entire periphery of the pump. The pump impeller is driven by a shaft 98 which is rotated by the engine in accordance with engine speed. It will be apparent that as engine speed increases, the pump speed will also increase as will the pressure of fuel within the chamber 22.

Passage 94 provides for the return of fuel from chamber 32 to passage 20 at the intake side of the fuel pump 18. Passage 94 has a restriction 95 therein.

The operation of the fuel control should be readily apparent. As engine manifold pressure increases, the pressure within bellows 62 correspondingly increases, raising the needle valve 52 to increase the effective opening of the metering orifice 26. This decreased restriction through the metering orifice tends to increase the pressure in the chamber 28 to move the diaphragm 34 away from the seat 37 to permit more fuel to flow into passage 40 through passage 38. Since the pressure in chamber 32 remains constant, the diaphragm will move downwardly from seat 37 to reduce the resistance to flow through passage 38 and hence restore the balance of pressure between chambers 28 and 32.

The flow of fuel passes from passage 25 axially inwardly through the eye 92 of the pump and radially outwardly into chamber 22. The rotation of the pump and impeller increases the flow of fuel radially outwardly through the pump and into chamber 22, and accordingly, as engine speed increases, the pressure of fuel in chamber 22 increases.

It will thus be seen that the flow of fuel to the nozzle 16 increases and decreases as the engine manifold pressure respectively increases and decreases. Also, the flow of fuel through nozzle 16 increases and decreases as the engine speed respectively increases and decreases.

The position of diaphragm 34 is thus determined to maintain a balance or equality in the pressures in the two chambers 28 and 32. The diaphragm will be moved by a differential in the pressure in these two chambers to a position to equalize the pressure in the chambers. Whenever the fuel pressure in chamber 28 exceeds the pressure in chamber 32, diaphragm 34 will be caused to move downwardly away from seat 37 to restore the pressure balance. On the other hand, when the pressure in chamber 28 is less than that in chamber 32, diaphragm 34 will be displaced upwardly to restore the balance. Because of the equalizing action of diaphragm 34, the pressure downstream from orifice 26 will equal the pressure in chamber 32 which latter is constant because of the constant pressure pump 18.

From the foregoing detailed description, it will be observed that the pressure downstream from orifice 26 is constant. At the upstream side of the orifice, or in chamber 22, the fuel is maintained at a pressure which is dependent upon the speed of the engine. This pressure, of course, is the pressure of fuel within passage 25 as increased by the operation of the centrifugal pump 84, which determines the pressure within the chamber 22.

Accordingly, flow of fuel through the orifice 26 is determined by manifold vacuum and engine speed, manifold vacuum directly affecting the size of the orifice and engine speed directly affecting the pressure drop across the orifice.

The foregoing specification constitutes a description of the improved fuel control for spark ignition internal combustion engines in such full, clear, concise and exact terms as to enable any person skilled in the art to practice the invention, the scope of which is indicated by the appended claims.

What I claim as my invention is:

1. A fuel system for an internal combustion engine having an air valve therefor, said system comprising a metering valve, a fuel pump for supplying fuel at constant pressure, means for delivering fuel from said fuel pump to the inlet of said metering valve at a pressure dependent upon engine speed, a chamber in open communication with the outlet from said metering valve, an outlet valve from said chamber, said outlet valve having a valve element movable in response to differential pressure and exposed at one side to pressure within said chamber and at the opposite side to the constant pressure of fuel from said fuel pump for maintaining the fuel at the outlet side of said metering valve at said constant pressure.

2. A fuel system for an internal combustion engine having an air valve therefor, said system comprising a metering valve, a fuel pump for supplying fuel at constant pressure, means for delivering fuel from said fuel pump to the inlet of said metering valve at a pressure dependent upon engine speed, said means including a non-positive fluid pump the inlet of which is connected to the supply of fuel at constant pressure from said fuel pump and the outlet of which is connected to the inlet of said metering valve, a chamber in open communication with the outlet from said metering valve, an outlet valve from said chamber, said outlet valve having a valve element movable in response to differential pressure and exposed at one side to pressure within said chamber and at the opposite side to the constant pressure of fuel from said fuel pump for maintaining the fuel at the outlet side of said metering valve at said constant pressure, and means responsive to manifold vacuum for modulating said metering valve.

3. A fuel supply system for an internal combustion engine having an intake manifold and an air valve therefor, said system comprising a metering valve, a chamber in open communication with the outlet from said metering valve, an outlet valve from said chamber, said outlet valve having a valve element movable in response to differential pressure and exposed at one side to pressure within said chamber and at the other side to constant pressure whereby to modulate said outlet valve to maintain a constant pressure at the outlet of said metering valve, and means for supplying fuel to the inlet of said metering valve at a pressure determined by engine speed.

4. A fuel system for an internal combustion engine comprising a metering valve, a source of fuel at constant pressure, means for delivering fuel from said source to the inlet of said metering valve, and means subject to the constant pressure of fuel at said source for maintaining the pressure of fuel at the outlet side of said metering valve at said constant pressure.

5. A fuel system for an internal combustion engine comprising a metering valve, a source of fuel at constant pressure, means for delivering fuel from said source to the inlet of said metering valve, a chamber in open communication with the outlet from said metering valve, an outlet valve from said chamber, said outlet valve having a valve element movable in response to differential pressure and exposed at one side to pressure within said chamber and at the other side to the constant pressure of said source whereby to modulate said outlet valve to maintain the pressure of fuel at the outlet side of said metering valve at said constant pressure.

6. A fuel system for an internal combustion engine comprising a metering valve, a fuel pump for supplying fuel at constant pressure, means for delivering fuel from said pump to the inlet of said metering valve at a pressure dependent upon engine speed, a chamber in open communication with the outlet from said metering valve, an outlet valve from said chamber, said outlet valve having a valve element movable in response to differential pressure and exposed at one side to pressure within said chamber and at the other side to the constant pressure of fuel from said fuel pump whereby to modulate the said outlet valve to maintain the pressure of fuel at the outlet side of said metering valve at said constant pressure, and means for modulating said metering valve.

7. A fuel system for an internal combustion engine comprising a metering valve, a fuel pump for supplying fuel at constant pressure, means for delivering fuel from said fuel pump to the inlet of said metering valve at a pressure dependent upon engine speed, and means subject to the constant pressure of fuel from said fuel pump for maintaining the fuel at the discharge side of said metering valve at said constant pressure.

[8. A fuel system for an internal combustion engine comprising a metering valve, a source of fuel under pressure, means for delivering fuel from said source to the inlet of said metering valve, and means subject to the pressure of fuel at said source for controlling the pressure of fuel at the outlet of said metering valve.]

[9. A fuel system for an internal combustion engine comprising a metering valve, a source of fuel at constant pressure, means for delivering fuel from said source to the inlet of said metering valve at a pressure dependent upon engine speed, and means subject to the pressure of fuel at said source for controlling the pressure of fuel at the outlet side of said metering valve.]

*10. A fuel system for an internal combustion engine comprising a metering valve, a source of fuel under pressure, means for delivering fuel from said source to the inlet of said metering valve, means in advance of said metering valve operated by the engine and acting directly upon the fuel delivered to the inlet of said metering valve for modifying the pressure of the fuel delivered in accordance with engine speed so that the pressure of the fuel delivered is dependent upon both source pressure and engine speed, an outlet from said metering valve, and means in said outlet subject to the pressure of fuel at said source for controlling the pressure of fuel in said outlet.*

*11. A fuel system for an internal combustion engine comprising a metering valve, a source of fuel under pressure, means for delivering fuel from said source to the inlet of said metering valve, means in advance of said metering valve operated by the engine and acting directly upon the fuel delivered to the inlet of said metering valve for modifying the pressure of fuel delivered in accordance with engine speed so that the pressure of the fuel*

*delivered is equal to source pressure plus an increment of pressure dependent upon engine speed, an outlet from said metering valve, and means in said outlet subject to the pressure of fuel at said source for controlling the pressure of fuel in said outlet.*

References Cited by the Examiner

The following references, cited by the Examiner, are of record in the patented file of this patent or the original patent.

UNITED STATES PATENTS

| | | | |
|---|---|---|---|
| 2,341,257 | 2/44 | Wuensch | 123—119 |
| 2,419,171 | 4/47 | Simpson et al. | 123—119 |
| 2,438,663 | 3/48 | Greenland | 123—119 |
| 2,449,468 | 9/48 | Greenland | 123—119 |
| 2,452,627 | 11/48 | Barfod. | |
| 2,489,214 | 11/49 | Barfod. | |
| 2,616,508 | 11/52 | Mock | 170—135.74 |
| 2,667,918 | 2/54 | Ifield. | |
| 3,067,581 | 12/62 | Reggio | 123—140.3 |

KARL J. ALBRECHT, *Primary Examiner.*

RICHARD B. WILKINSON, *Examiner.*